United States Patent
Nishiyama

[11] Patent Number: 6,102,009
[45] Date of Patent: Aug. 15, 2000

[54] FUEL INJECTION METHOD AND DEVICE FOR ENGINES

[75] Inventor: Yasuhiro Nishiyama, Kanagawa, Japan

[73] Assignee: Isuzu Motors Limited, Tokyo, Japan

[21] Appl. No.: 09/157,955

[22] Filed: Sep. 22, 1998

[30] Foreign Application Priority Data

Sep. 26, 1997 [JP] Japan ................................ 9-277974

[51] Int. Cl.$^7$ ................................................ F02M 51/00
[52] U.S. Cl. ........................ 123/490; 123/456; 701/105
[58] Field of Search ............................. 123/478, 480, 123/490, 456; 701/105

[56] References Cited

U.S. PATENT DOCUMENTS

| Re. 33,270 | 7/1990 | Beck et al. | 123/446 |
| 4,217,862 | 8/1980 | Fort et al. | 123/478 |
| 5,533,492 | 7/1996 | Willey et al. | 123/488 |
| 5,535,621 | 7/1996 | Glidewell et al. | 123/478 |

FOREIGN PATENT DOCUMENTS

60-060020 12/1985 Japan .
8-210174 8/1996 Japan .

*Primary Examiner*—Erick Solis
*Attorney, Agent, or Firm*—Browdy and Neimark

[57] ABSTRACT

This invention determines the output timing of the injection command signal to each of the injectors so that the fuel injection timing agrees with the basic target injection timing even when there are variations in the fuel injection timing among the injectors, and thereby improves the exhaust emission performance of the engine. The time $T_2$ of an intersection between the straight line Lp representing an average Pa of the common rail pressure before it starts to fall and the first-degree approximation straight line Ld having a maximum inclination of fall of the common rail pressure is determined as the timing at which the common rail pressure starts to fall. Based on the time $T_2$ and the average pressure Pa, the delay time $\Delta Td$ which elapses from the output timing $T_0$ of the injection command signal to each of the injectors to the actual fuel injection timing $T_1$ is calculated. The output timing $T_0$ for the injection command signal is determined as an instant the delay time $\Delta Td$ before the basic target injection timing Tb, which is determined from the operating state.

6 Claims, 7 Drawing Sheets

FUEL INJECTION METHOD AND DEVICE FOR ENGINES

BACKGROUND OF THE INVENTION

1. Field of the Invention

The present invention relates to a fuel injection method and device for engines which receives fuel from a common rail and injects the fuel from injectors into combustion chambers.

2. Description of the Prior Art

As for the fuel injection control in engines such as diesel engines, a common-rail type fuel injection system has been known which provides a high injection pressure and performs optimum control on the injection characteristics, such as fuel injection timing and the amount of fuel injected, according to the operating condition of the engine. The common-rail type fuel injection system stores in the common rail a fuel pressurized to a predetermined pressure by a fuel pump and then injects the stored fuel from injectors into corresponding combustion chambers. A controller controls the fuel pressure in the common rail and the operation of control valves for the injectors so that the pressurized fuel will be injected from each injector under optimum injection conditions according to the engine operating conditions.

Figure 7:
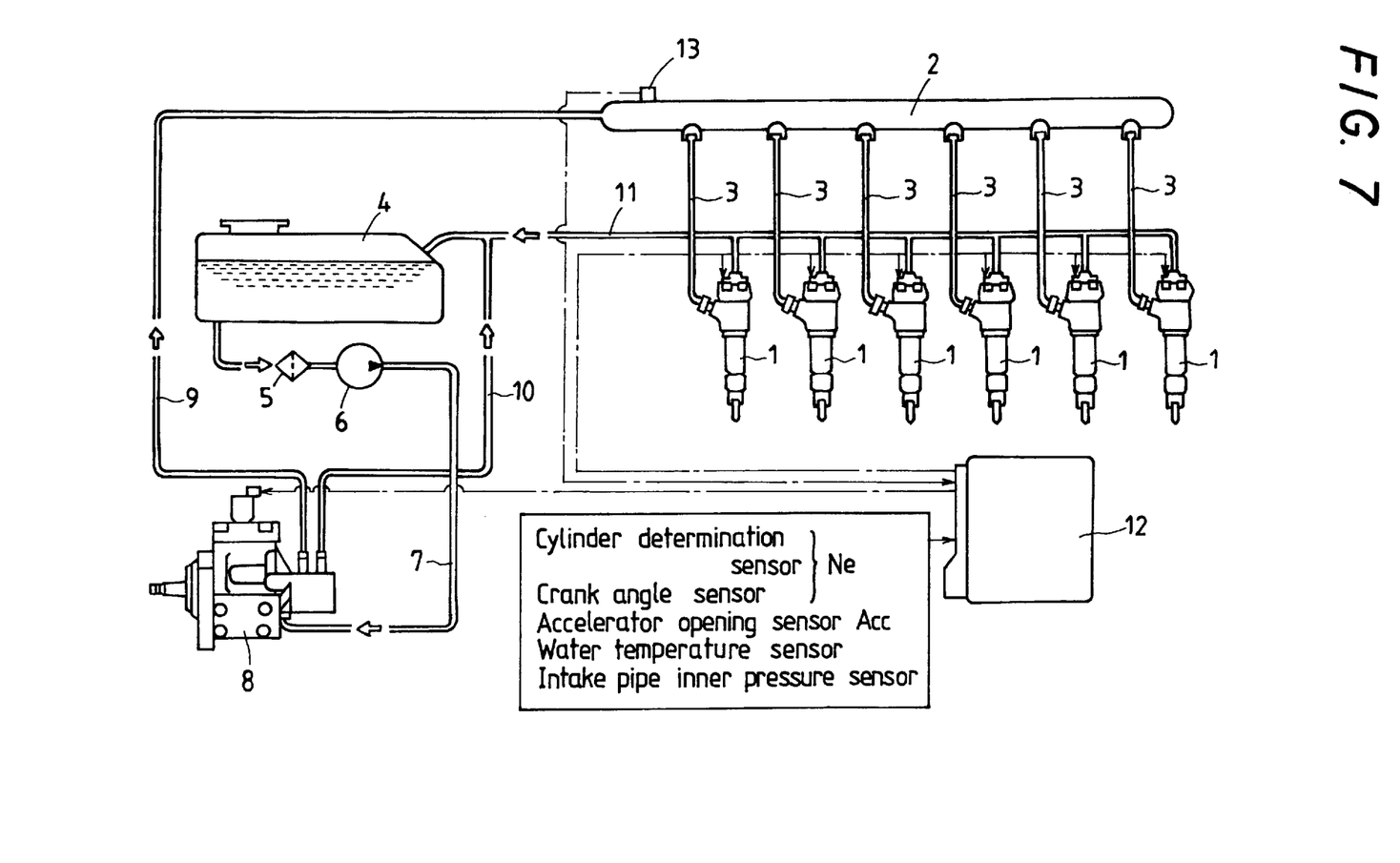
FIG. 7 is a schematic diagram showing a common rail type fuel injection system.

The conventional common-rail type fuel injection system is described by referring to FIG. 7. The fuel is supplied to individual injectors 1 from a common rail 2 through branch pipes 3 that form a part of the fuel passage. The fuel, which was pumped by a feed pump 6 from a fuel tank 4 through a filter 5 and pressurized to a predetermined intake pressure, is delivered to a fuel pump 8 through a fuel pipe 7. The fuel pump 8 is a plunger type which is driven by the engine to raise the fuel pressure to a high pressure determined by the operating condition of the engine and deliver the pressurized fuel through a fuel pipe 9 to the common rail 2. The fuel is then stored temporarily in the common rail 2 at the elevated pressure, from which it is supplied to individual injectors 1. As many injectors 1 as the number of cylinders are provided in the engine. These injectors 1 are controlled by a controller 12, an electronic control unit, to inject fuel supplied from the common rail 2 into the corresponding combustion chambers at optimum timings and in optimum amounts. Because the pressure at which the fuel is injected from the injectors 1 is almost equal to the pressure of the fuel stored in the common rail 2, the injection pressure is controlled by controlling the fuel pressure in the common rail 2.

The fuel released from the fuel pump 8 is returned to the fuel tank 4 through a return pipe 10. Of the fuel supplied from the branch pipes 3 to the injectors 1, the fuel that was not used for injection into the combustion chambers is returned to the fuel tank 4 through a return pipe 11. The controller 12 is supplied with signals from a variety of sensors for detecting the engine operating condition, which include: engine cylinder determination and crank angle sensors for detecting an engine revolution speed Ne; an accelerator opening sensor for detecting the amount of accelerator operation Acc; a water temperature sensor for detecting the cooling water temperature; and an intake pipe inner pressure sensor for detecting the inner pressure of the intake pipe. The controller 12, based on these signals, controls the fuel injection characteristics of the injectors 1, i.e., the fuel injection timing and the amount of fuel to be injected so that the engine output will become optimum for the current engine operating condition. The common rail 2 is provided with a pressure sensor 13 which detects the fuel pressure in the common rail 2 and sends the detection signal to the controller 12. The controller 12 controls the amount of fuel delivered from the fuel pump 8 so that the fuel pressure in the common rail 2 is restored to a predetermined pressure after the common rail pressure has fallen as a result of fuel consumption from the common rail 2 for injection from the injectors 1.

The conventional common-rail type fuel injection system controls the fuel injection pressure to a target value according to the engine operating state and at the same time calculates injection characteristics corresponding to the operating state, i.e., the amount of fuel to be injected (determined by the fuel injection pressure and the fuel injection period) and the fuel injection timing, and controls the operation of the injectors according to the calculated results, thereby realizing the fuel injection characteristics conforming to the engine operating state. The common rail pressure that determines the injection pressure is raised by the fuel pump and controlled to a predetermined injection pressure by a pressure control valve (see Japanese Patent Publication No. 60020/1985 for example).

In the common-rail type fuel injection device, the controller sends a command pulse as an injection command signal to each of the solenoid valves of the injectors, and a needle valve is lifted by a solenoid that is energized in response to the command pulse to open nozzle holes provided at the nozzle end of each injector to inject fuel. It should be noted, however, that there is normally a time lag from the instant that the controller issues a command pulse to the solenoid valve to the instant that the fuel actually starts to be injected from the nozzle holes of the injector. This time lag results from a response delay present in a drive circuit, i.e., a delay after the command pulse has been issued from the controller to the solenoid until the solenoid is actually energized, and a mechanical delay after the solenoid has been energized to lift the needle valve until the fuel is injected from the nozzle holes. Further, even if the timings at which to turn on the command pulses from the controller are the same, the fuel injection start timings may differ from one injector to another because of variations among individual injectors and among cylinders (e.g., difference in distance between the pressure sensor and the injector).

The conventional fuel injection device for engines deals with such a time lag by taking it to be a fixed delay and not considering variations of the time lag. Hence, changes over time of the time lag and variations among individual injectors combine to prevent optimum combustion of fuel, causing deterioration of the exhaust emission performance and also engine vibrations due to differences in the combustion timing among cylinders.

The method and device for detecting fuel injection timings, disclosed in Japanese Patent Laid-Open No. 210174/1996 and intended to determine precise fuel injection timings in a diesel engine, performs a sequence of steps which involve monitoring a pressure in the fuel pipe connecting a fuel injection pump of the diesel engine and the fuel injection nozzles, detecting a first fall in the monitored pressure of a magnitude greater than a predetermined value after the monitored pressure has reached a predetermined high pressure value, and then determining a pressure fall start timing to be a fuel injection start timing. The above-described method and device for detecting the fuel injection timing, however, concerns a fuel injection system using a distribution or column type pump that distributes fuel to the injectors, and is not intended for application to the common-rail type fuel injection system. That is, the type of the system for which the above method is intended differs from the common-rail type fuel injection system under consideration in this invention.

SUMMARY OF THE INVENTION

The object of this invention is to provide a fuel injection method and device for the common-rail type fuel injection system in engines, which takes advantage of the fact that the common rail pressure, which is monitored, falls according to the amount of fuel injected by the injectors, and which, even when there are variations in the fuel injection timing among the injectors, can precisely determine the timing at which the injectors have actually started injecting fuel based on the timing at which the monitored common rail pressure started falling.

This invention relates to a fuel injection method for engines which comprises the steps of: storing fuel delivered by a fuel pump in a common rail; injecting the fuel from the common rail into combustion chambers through nozzle holes formed in injectors driven by an injection command signal; selecting a basic target injection timing corresponding to a present engine operating state from among predetermined basic target injection timing data as related to engine operating states; determining, by using a predetermined function having as variables at least a timing after the start of fuel injection at which the common rail pressure starts to fall, an injection delay time that elapses from an output timing of the injection command signal to a fuel injection timing at which the fuel injection from each of the injectors is started; and determining the output timing of the injection command signal from the basic target injection timing and the injection delay time.

This invention also relates to a fuel injection device for engines which comprises: a common rail to store fuel delivered by a fuel pump; injectors having nozzle holes formed therein through which the fuel supplied from the common rail is injected into combustion chambers; operating state detection means to monitor the operating state of the engine; a pressure sensor to monitor the pressure of the common rail; and a controller to output an injection command signal to each of the injectors and select a basic target injection timing corresponding to a present engine operating state from basic target injection timing; wherein the controller determines, by using a predetermined function having as variables at least a timing after the start of fuel injection at which the common rail pressure starts to fall, an injection delay time that elapses from an output timing of the injection command signal to a fuel injection timing at which the fuel injection from each of the injectors is started, and also determines the output timing of the injection command signal from the basic target injection timing and the injection delay time.

Using a graph with time and the common rail pressure as coordinate axes, the timing at which the common rail pressure starts to fall due to fuel injection is determined as a time coordinate of an intersection between a straight line approximating a common rail pressure falling curve before reaching a first minimal value and a straight line approximating the common rail pressure before the start of the fuel injection. The timing at which the common rail pressure starts to fall due to fuel injection is difficult to detect with precision. Hence, using a graph having time and the common rail pressure as coordinate axes, the curve representing the change over time of the common rail pressure is approximated by two straight lines—a line approximating the common rail pressure before it starts to fall and a first-degree regression line at a point (inflection point) on the curve having a maximum inclination of pressure fall—and the time coordinate of an intersection of these two lines is determined to be the timing when the common rail pressure starts to fall. The use of this determined timing at which the common rail pressure starts to fall does not pose any practical problem in determining with experiments the injection delay time that elapses from the injection command output timing to the fuel injection timing.

The common rail pressure approximating straight line before the start of fuel injection is determined as an average value of the common rail pressures in a predetermined period ranging from the output timing of the injection command signal to a point before the timing at which the common rail pressure starts to fall. In the predetermined period ranging from the output timing of the injection command signal to a point before the timing at which the common rail pressure starts to fall, the common rail pressure has yet to start falling. For each fuel injection of the injector, the sampled values of the common rail pressure detected during this period are averaged to determine a fixed common rail pressure before the pressure starts to fall due to fuel injection. Hence, the common rail pressure approximating line before the start of fuel injection is a straight line having the averaged value on the common rail pressure coordinate and extending parallel to the time axis.

Further, the injection delay time from the outputting of the injection command signal to the fuel injection timing is calculated for each injector. The variation among cylinders, i.e., the difference among cylinders in the distance from the pressure sensor for detecting the common rail pressure to the injector nozzle holes affects the pressure change propagation time. The variation among the cylinders includes variations among individual injectors and branch pipes.

As described above, the present invention determines the injection delay time, which elapses from the output timing of the injection command signal to the fuel injection timing, according to the predetermined function by using at least the common rail pressure before the fuel injection starting and the timing at which the common rail pressure starts to fall after the fuel injection starting. Based on the basic target injection timing and the injection delay time, the output timing of the subsequent injection command signal is determined.

That is, the timing at which the common rail pressure begins to fall is calculated from the data of the common rail pressure detected by the pressure sensor. Based on the calculated timing at which the common rail pressure starts to fall and the common rail pressure immediately before the fuel injection starts, the time which elapses from the moment when the injection command signal was output to the moment when the fuel actually starts to be injected (injection delay time) is determined by the predetermined function. The timing at which to output the injection command signal to each of the injectors is determined from the basic target injection timing—which was obtained as an optimum injection timing from the engine operating state such as accelerator pedal depression amount and engine revolution speed—and also from the injection delay time calculated as described above.

Hence, even when there are changes with time in the ability to respond to the injection command signal for each of the injectors or variations in the fuel injection timing among the injectors, the actual fuel injection is initiated at a basic target injection timing, which is an optimum fuel injection timing in terms of exhaust emission performance and output performance. Hence, improvements are made in the exhaust emission performance and the output performance.

In the conventional fuel injection devices which regard as constant the injection delay time which elapses from the output timing of the injection command signal to the actual fuel injection timing, there are always variations in the fuel injection start timing of even the same injector due to changes with time and also among individual injectors when the engine has two or more cylinders even when the output timings of the injection command signal are set to be equal. Thus, combustion timing variations among different engines and, even in the same engine, among different cylinders that perform successive combustion result in a deteriorated exhaust emission performance and engine vibrations.

On the contrary, this invention ensures that each of the injectors can always perform the actual fuel injection at the optimum basic target injection timing, thereby preventing deterioration of the exhaust emission performance of the engine and its vibration.

This invention does not require a novel pressure sensor for determining the fuel injection start timing but utilizes the existing pressure sensor for detecting the common rail pressure mounted in the common rail and processes the detected information to determine the fuel injection start timing. Therefore, in the fuel injection system using a distribution pump for example, an additional pressure sensor is not required as a new component for each pipe connecting the fuel injection pump and the individual injectors, thus preventing increases in the number of parts and in the manufacturing cost due to increased parts count. A further feature of this invention is that, compared with a system that obtains information for detecting the fuel injection timing by comparing the pressure of the fuel pipe connecting the fuel injection pump and the fuel injection nozzles with a predetermined pressure (threshold value), the system of this invention can deal with large changes in the common rail fuel pressure caused by the operating state of the engine.

DETAILED DESCRIPTION OF THE EMBODIMENT

Now, by referring to the accompanying drawings, embodiments of the fuel injection method and device for engines according to this invention will be described.

The common-rail type fuel injection system shown in FIG. 7 may be used as a fuel injection system for this invention. The constitutional elements of this system are assigned the same reference numerals as those shown in FIG. 7 and their repetitive explanations are omitted.

Figure 1:
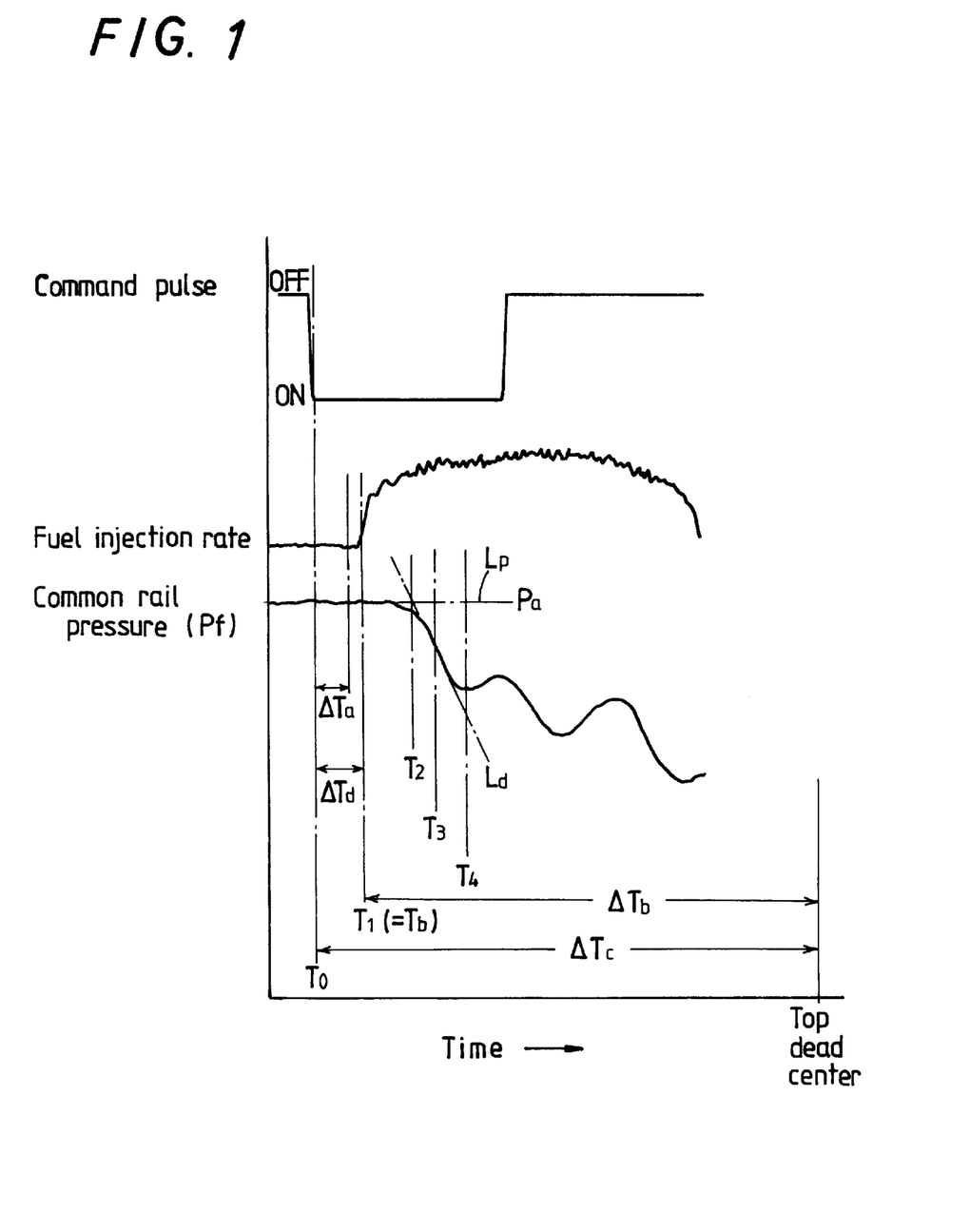
FIG. 1 is a graph showing changes over time of a command pulse (injection command signal), a fuel injection rate and a common rail pressure in the common-rail type fuel injection system.

Changes over time of the command pulse, the fuel injection rate and the common rail pressure will be explained by referring to the graph of FIG. 1.

In each cylinder n, when the command pulse is turned on at a time $T_0$ (the time at which an injection command signal is issued) before a top dead center, the injector 1 starts injecting fuel with a delay time $\Delta Td$ at a fuel injection time $T_1$. The actual pressure Pf of the common rail 2 (common rail pressure) does not fall immediately after the fuel injection from the injector 1 has started but starts falling with some delay. When the pressure sensor 13 detects a fall in the actual pressure Pf of the common rail 2, the fuel pump 8 is controlled to supply fuel to recover the pressure in the common rail 2. In a predetermined initial period $\Delta Ta$ of the delay time $\Delta Td$, variations of the actual pressure of the common rail 2 is small. By taking the average of the pressures during this initial period, the average common rail pressure Pa before the fuel injection can be determined. From the operating state of the engine, a target injection timing command value $\Delta Tb$ as measured retrospectively from the top dead center is determined and a basic target injection timing Tb is set. The delay time $\Delta Td$ is determined from the average pressure Pa and the common rail pressure fall from the start of timing. From the delay time $\Delta Td$, an output timing $T_0$ for the injection command signal (command pulse) is determined.

The target injection timing command value $\Delta Tb$ is a command value to determine the basic target injection timing Tb at which the actual fuel injection should desirably be started, and is expressed as a length of time measured retrospectively from the top dead center. The target injection timing command value is mapped in relation to the engine operating states beforehand. When the fuel injection timing control is properly performed, the fuel injection timing $T_1$ agrees with the basic target injection timing Tb. An injection timing command value $\Delta Tc$ is a command value to determine the output timing $T_0$ for the injection command signal to the injector 1 and is expressed as a length of time measured retrospectively from the top dead center. Further, the delay time $\Delta Td$ is a delay from the moment when the injection command signal is output to the start of the actual fuel injection, and exhibits different values for different injectors (When it is to be particularly emphasized that the delay time varies from one injector to another, the delay time is expressed as $\Delta Td(n)$ to indicate that it depends on the cylinder number n).

Figure 2:
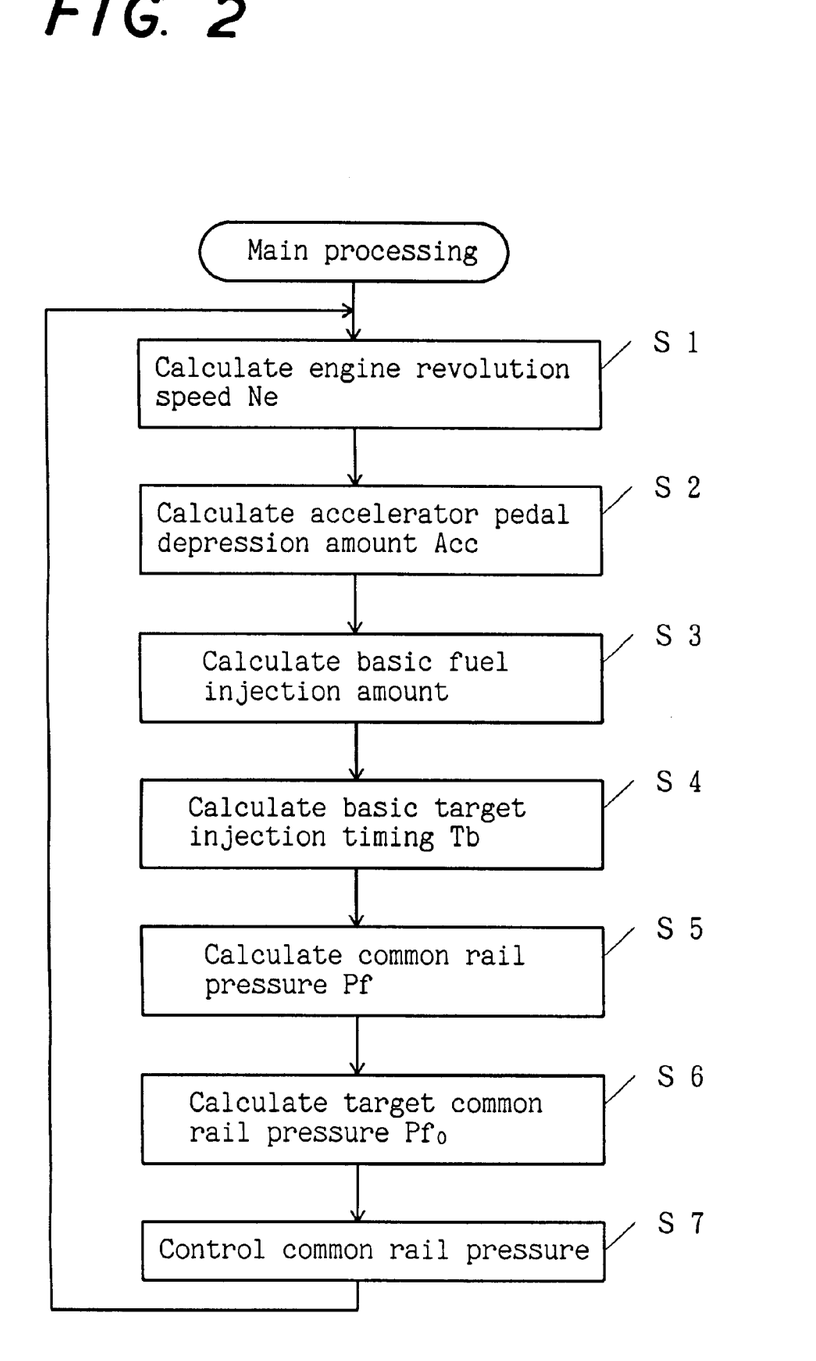
FIG. 2 is a flow chart showing a main processing of the fuel injection according to this invention.

Referring to the flow chart of FIG. 2, the main processing of fuel injection will be explained. The main processing used for the controller that controls the fuel injection into the engine is interrupted at appropriate intervals.

(1) An engine revolution speed Ne is calculated from pulses generated by a revolution speed detector mounted on the output shaft of the engine as the engine is operated (step S1).

(2) An accelerator pedal depression amount Acc is calculated from a signal generated by an accelerator pedal depression sensor (step S2).

(3) A basic fuel injection amount is calculated from the engine revolution speed Ne detected by step S1 and the accelerator pedal depression amount Acc detected by step S2 according to the map, which was tuned up beforehand to provide appropriate exhaust emissions, engine output and driving comfort (step S3).

(4) The target injection timing command value $\Delta Tb$ as measured retrospectively from the top dead center is determined from the engine revolution speed Ne detected by step S1 and the accelerator pedal depression amount Acc detected by step S2, and then the basic target injection timing Tb is calculated (step S4). The basic fuel injection amount calculated by step S3 may be used instead of the accelerator pedal depression amount Acc detected by step S2.

(5) The actual pressure of the common rail, i.e., the common rail pressure Pf is calculated based on a signal generated by the common rail pressure sensor 13 (step S5).

(6) By using the engine revolution speed Ne detected by step S1 and the basic fuel injection amount calculated by step S3, the target pressure of the common rail 2, i.e., the target common rail pressure $Pf_0$, is calculated that is required to obtain the calculated basic fuel injection amount (step S6).

(7) The controller 12 controls the variable displacement fuel pump 8 so that the common rail pressure Pf detected by the step S5 agrees with the target common rail pressure $Pf_0$. The above sequence of steps is repetitively executed during the operation of the engine.

Figure 3:
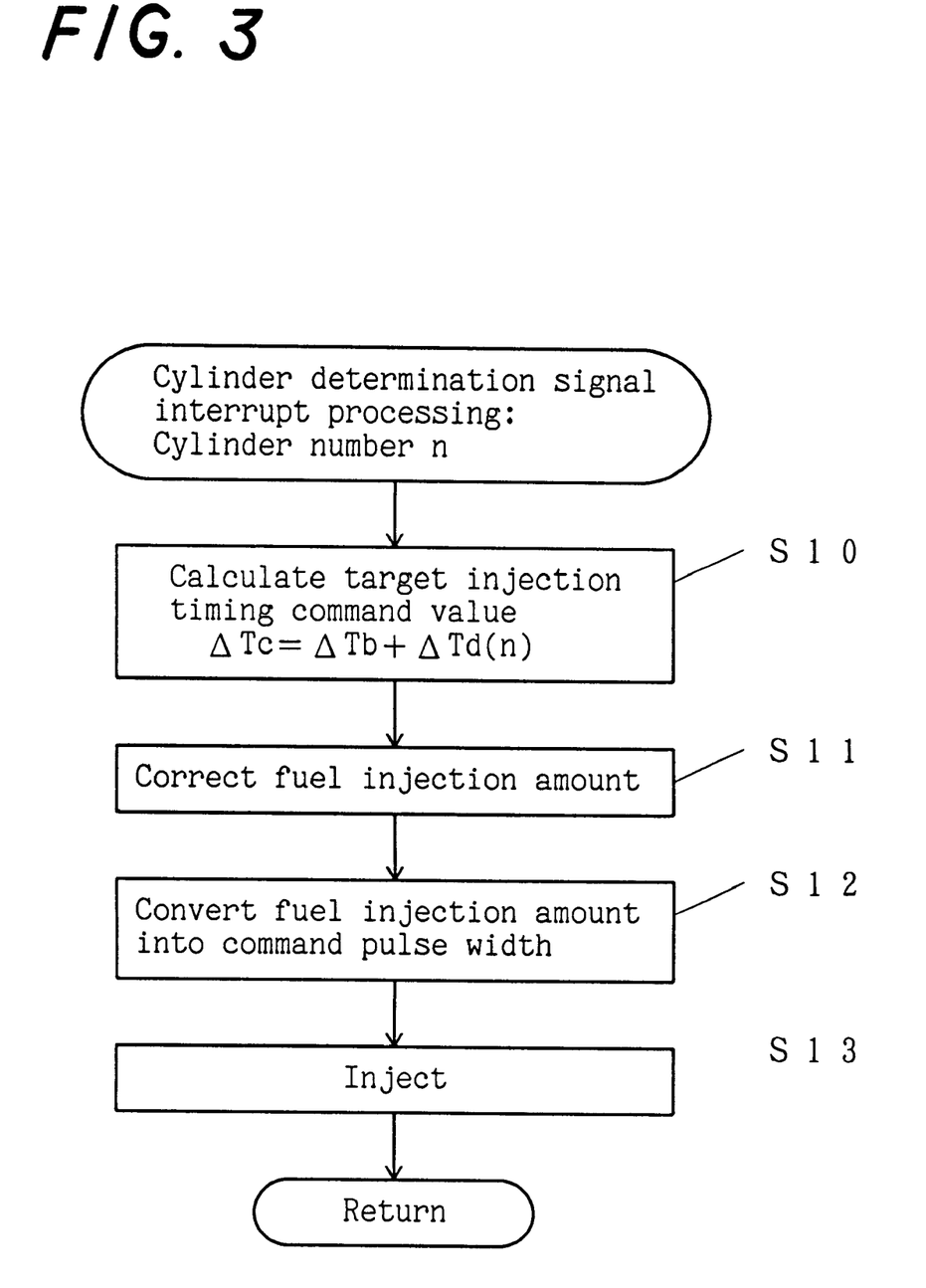
FIG. 3 is a flow chart showing an interrupt processing triggered by the cylinder determination signal in the execution of the flow chart of FIG. 2.

Next, the interrupt processing by the cylinder determination signal will be explained by referring to the flow chart of FIG. 3. The cylinder number is represented by n.

(1) The injection timing command value ΔTc is calculated from the following equation using the target injection timing command value ΔTb calculated by step S4 and measured retrospectively from the top dead center and the delay time ΔTd(n) for the cylinder n determined from a flow chart described later (step S10).

$$\Delta Tc = \Delta Tb + \Delta Td(n)$$

where ΔTd(n) is a positive value that can vary from cylinder to cylinder. By adding ΔTd(n) determined by a method described later to the target injection timing command value ΔTb, which is calculated from the engine revolution speed Ne and the accelerator pedal depression amount Acc and defined to be measured backward from the top dead center, the timing $T_0$ at which to issue the injection command signal from the controller 12 is determined which is a timing the injection timing command value ΔTc before the top dead center.

(2) The fuel injection amount is corrected (step S11), which is necessitated by the fuel injection timing being corrected.

(3) The fuel injection amount corrected by step S11 is converted into a width of the command pulse as an injection command signal (step S12). That is, the width of the command pulse that is applied to the solenoid of the injector 1 and which defines the period during which the solenoid valve is open is determined.

(4) The actual fuel injection is executed and the command pulse timing and width are written into the output register (step S13).

As described above, when a cylinder determination signal is detected at a predetermined time before the top dead center on the power stroke, the above interrupt processing is executed for each cylinder (n). When the injection is finished, the program returns to the main processing of FIG. 2 where it was running before it jumped to the interrupt processing.

Figure 4:
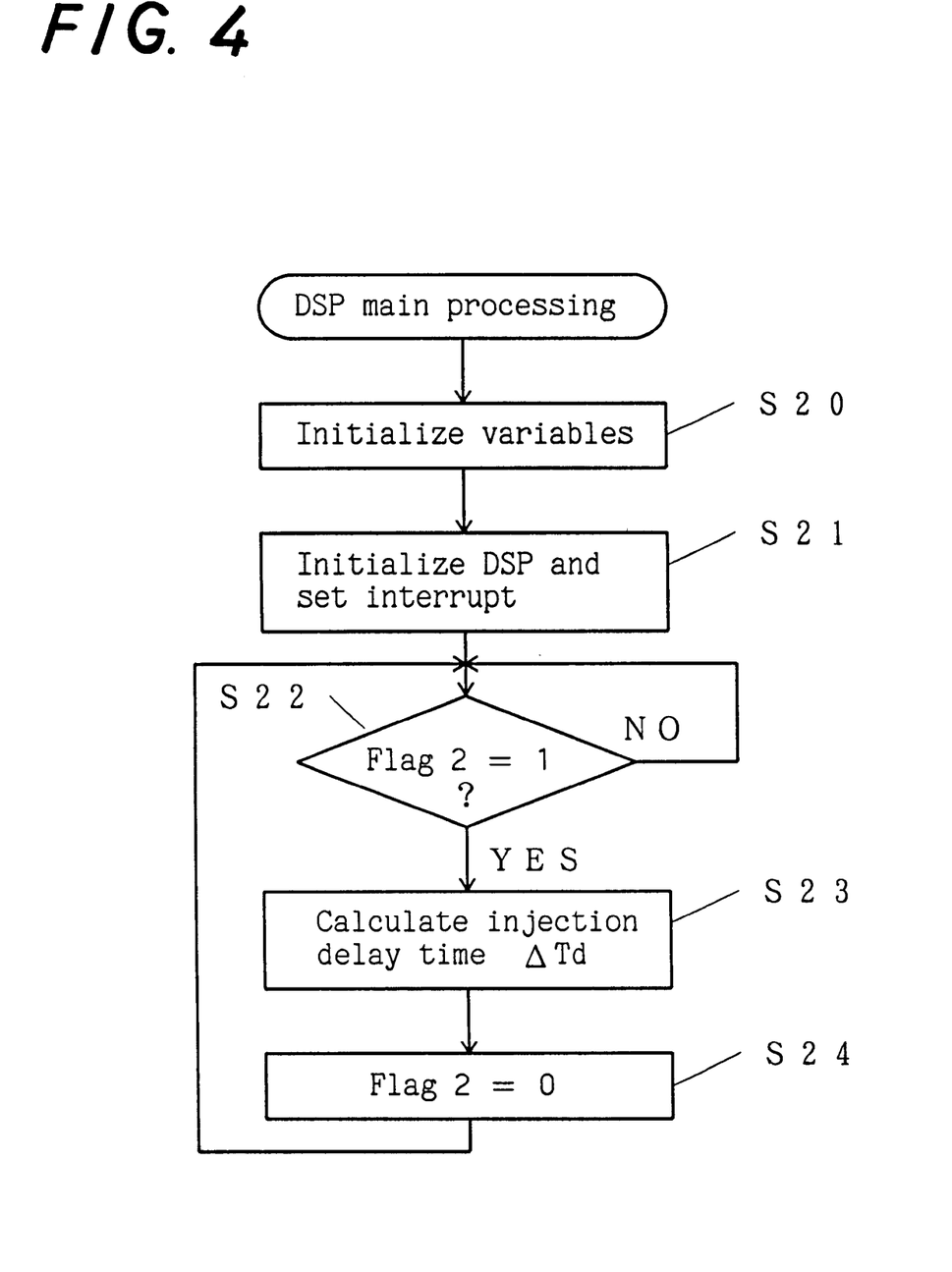
FIG. 4 is a flow chart showing a main processing of DSP for calculating an injection delay time in the execution of the flow chart of FIG. 3.

Next, by referring to the flow chart of FIG. 4, the main processing performed by the digital signal processor (DSP) to calculate the injection delay time ΔTd(n) referred to in step S10 will be explained.

The DSP is employed to perform processing in parallel with CPU because the amount of data to be buffered in calculating the injection delay time is large and calculations are required to be performed in a short processing time. If a sufficiently fast CPU is used, however, the parallel processing by DSP is not necessary.

(1) Variables to be handled are initialized (step S20).

(2) The DSP is initialized and the DSP interrupt processing is set (step S21).

(3) A check is made to see if data required to calculate the injection delay time ΔTd(n) is buffered or not (step S22). This decision is made based on the state of a data buffering completion flag Flag 2. The Flag 2 is set during the course of a 100-kHz interrupt processing described later. If the data buffering is finished, the program proceeds to step S23. If not, the program waits until the data buffering is finished.

(4) The injection delay time ΔTd(n) is calculated (step S23). The details of the calculation process will be explained later by referring to the flow chart shown in FIGS. 5 and 6.

(5) The data buffering completion flag (Flag 2) is cleared (step S24) and the program waits until the data required for calculating the next injection delay time ΔTd(n) is accumulated.

Figure 5:
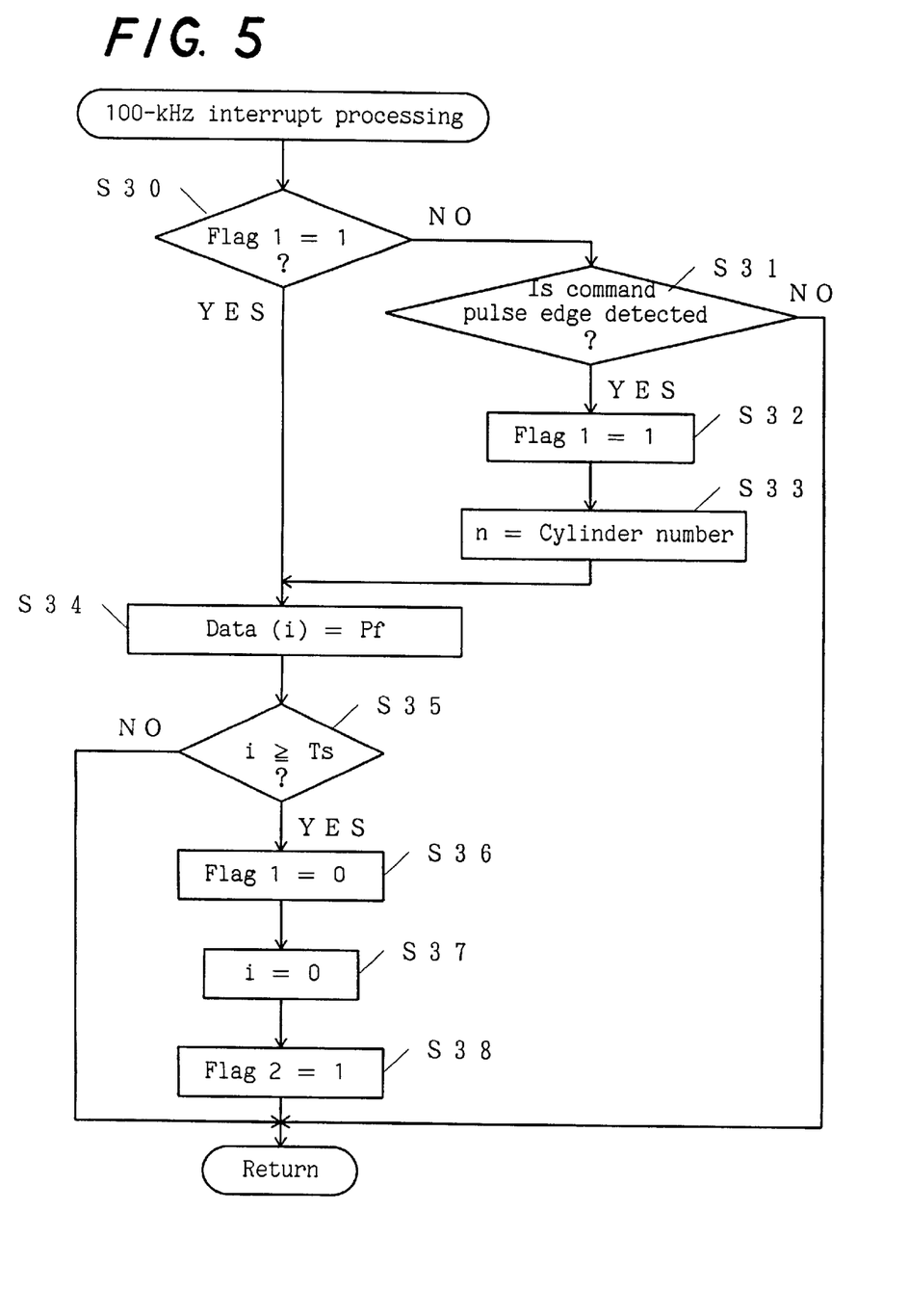
FIG. 5 is a flow chart showing a 100-kHz interrupt processing to buffer data on the common rail pressure for calculating the injection delay time in the execution of the flow chart of FIG. 3.

Next, by referring to the flow chart of FIG. 5, the 100-kHz interrupt processing will be explained. The value of the common rail pressure Pf is buffered at 100-kHz intervals to calculate the injection delay time ΔTd(n). Buffering is started when the ON state (fall) of the command pulse to the injector 1 is detected. The end of the buffering is determined beforehand so that the time it takes to confirm a reduction and vibrations of the common rail pressure Pf can be secured. That is, the buffering end timing is determined beforehand with experiments considering variations of the injection delay time and of the common rail pressure reduction.

(1) A check is made to see if a flag (Flag 1) is set indicating the data is being buffered (step S30). If the data is being buffered, the program moves to step S34. If not, the program moves to step S31.

(2) If the data is not being buffered, the edge of the command pulse for driving the solenoid of the injector 1 is detected (step S31). When the edge of the command pulse is detected, the program proceeds to S32. If not, the program terminates the 100-kHz interrupt processing.

(3) Because the edge of the command pulse is detected, i.e., it is found that the injection command signal has been output, the flag (Flag 1) is set (step S32).

(4) A cylinder number for which the detected command pulse to the injector was destined is retrieved (step S33). The cylinder number n is stored in memory during the cylinder determination signal interrupt processing in FIG. 3.

(5) The data is being buffered and the flag (Flag 1) is already set; or the common rail pressure Pf is buffered as data [Data (i)] from the moment when the edge of the command pulse was detected (step S34).

(6) A check is made to see if the number i of data on the common rail pressure Pf is equal to or larger than the required number Ts (step S35). When the number i is less than the required number Ts, the program returns to step S30 to continue retrieving data. If the number i has reached the required number Ts, the program proceeds to step S36 and ends the buffering processing. The required number Ts is set to a number that can cover the several times the maximum value of the injection delay time ΔTd because the variation of the injection delay time ΔTd is within a fixed range.

(7) The data buffering processing clears the flag (Flag 1) (step S36), clears a buffering counter i indicating the data number (step S37), and sets a data buffering end flag (Flag 2) (step S38).

Figure 6:
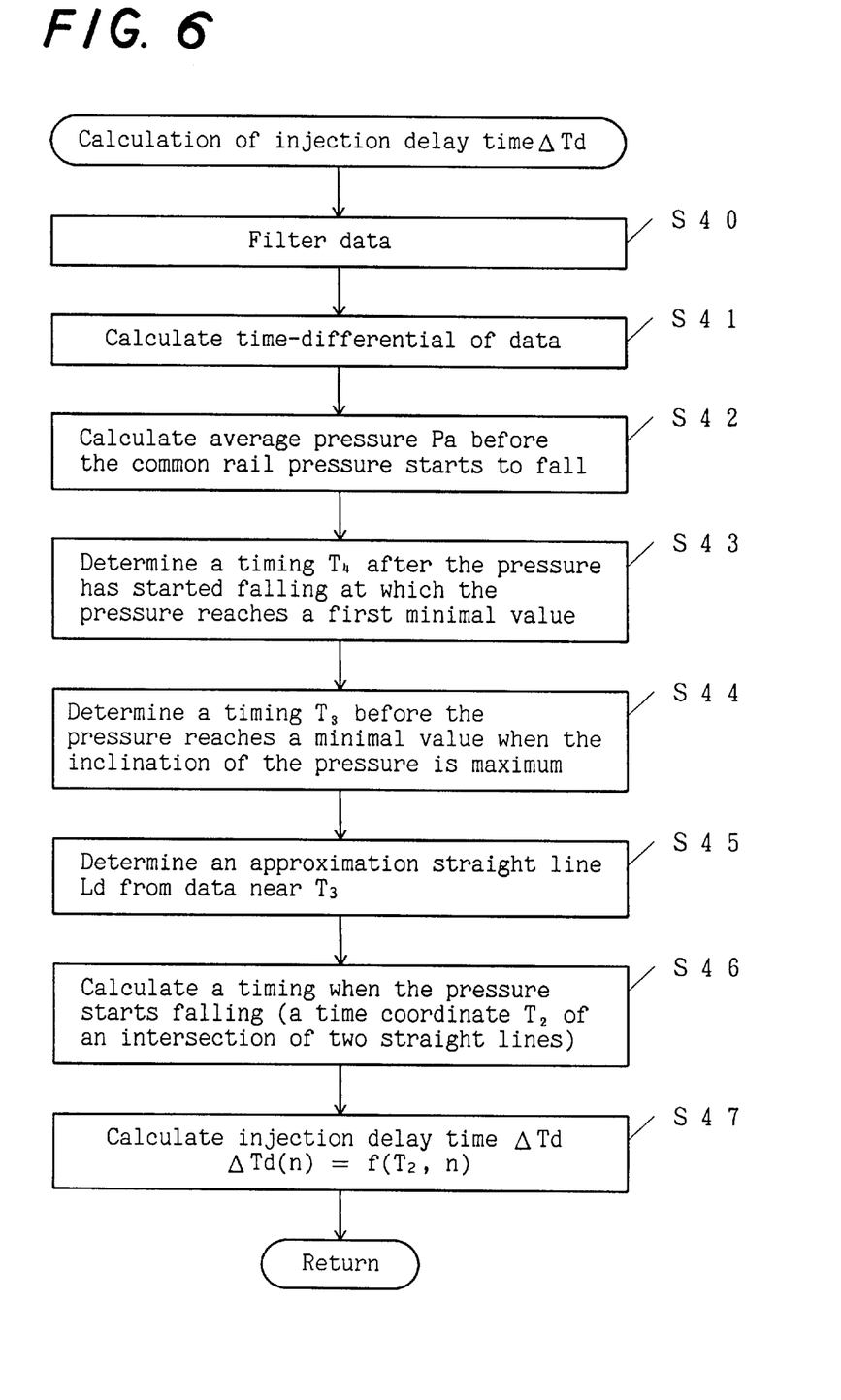
FIG. 6 is a flow chart for calculating the injection delay time from the common rail pressure data buffered by the execution of the flow chart of FIG. 5.

Further, the calculation of the injection delay time ΔTd from the buffered data of common rail pressure Pf will be described by referring to the flow chart of FIG. 6.

(1) Because the retrieved data of the common rail pressure Pf contains noise, the data are subjected to filtering such as a running mean processing (step S40).

(2) The common rail pressure Pf is time-differentiated to obtain a pressure variation (step S41). Because the data of the common rail pressure Pf are discrete data that vary over time, the differential of the common rail pressure can be calculated by using a difference between adjacent data values.

(3) Because a group of data begins to be retrieved upon detection of a fall of the command pulse, the data obtained within a certain period ΔTa of the head of the data string represents the common rail pressure Pf that has yet to start falling. The data during this period are averaged to determine an average pressure Pa before the start of injection (step S42). The period ΔTa is set as a duration in which the common rail pressure Pf has yet to start falling and the injection delay time ΔTd has variations within a fixed range. Hence, it is desired that the period ΔTa be set so as not to fall within this variation range.

(4) A timing $T_4$ after the common rail pressure Pf has started falling at which the common rail pressure takes a first minimal value is determined (step S43). The timing $T_4$ can be determined as a moment when the time-differential calculated by step S41 first changes from a negative to a positive value.

(5) In the period ranging from the head of the data to the timing $T_4$, the timing $T_3$ at which the time-differential exhibits a minimal value is determined (step S44). The timing $T_3$ represents an instant (a point of inflection) at which the fall of the common rail pressure Pf is greatest.

(6) A first-degree regression calculation is performed based on the times of several points around the timing $T_4$ and the data at these times to determine a straight line Ld (one-dot line in FIG. 1) approximating the falling curve of the common rail pressure Pf at the timing $T_3$ (step S45). This approximating straight line is equal to a tangent at the point of inflection on the common rail pressure curve.

(7) The timing $T_2$ at an intersection between the straight line Lp representing the average pressure Pa before the start of injection (indicated by one-dot line parallel to the time axis in FIG. 1) and determined by step S42 and the approximating straight line Ld determined by step S45 is calculated (step S46). The timing $T_2$ is regarded as an instant at which the common rail pressure starts to fall.

(8) The injection delay time ΔTd(n) is calculated from the following equation (step S47).

$$\Delta Td(n)=f(T_2,n)$$

The ΔTd(n) is calculated by substituting actual values obtained from the above steps into the predetermined function f having as variables the timing $T_2$ at the intersection between the line Lp and the approximating line Ld and the cylinder number n. As the timing $T_2$ is delayed, the actual fuel injection starting tends to be delayed. It should also be noted that the injection delay time ΔTd(n) is greater for a cylinder number n whose location is farther away from the pressure sensor provided in the common rail. In addition to the timing $T_2$ and the cylinder number n, the differing common rail pressures Pf before starting to fall are also considered to affect the injection delay time ΔTd(n) in accordance with differing pressure propagation speeds.

As described above, while the example embodiment has shown the changing values of command pulse, fuel injection rate and common rail pressure with respect to time, these values may be related to any reference quantity other than time, such as crank angle, as long as the reference quantity virtually represents time. Furthermore, although a first-degree regression line is used for approximation of the common rail pressure falling curve, a higher degree approximation curve may also be used.

What is claimed is:

1. A fuel injection method for engines comprising the steps of:

storing fuel delivered by a fuel pump in a common rail;

injecting the fuel from the common rail into combustion chambers through nozzle holes formed in injectors driven by an injection command signal;

selecting a basic target injection timing corresponding to a present engine operating state from among predetermined basic target injection timing data as related to engine operating states;

determining, by using a predetermined function having as variables at least a timing after the start of fuel injection at which the common rail pressure starts to fall, an injection delay time that elapses from an output timing of the injection command signal to a fuel injection timing at which the fuel injection from each of the injectors is started; and determining the output timing of the injection command signal from the basic target injection timing and the injection delay time;

wherein, using a graph with time and the common rail pressure as coordinate axes, the timing at which the common rail pressure starts to fall due to fuel injection is determined as a time coordinate of an intersection between a straight line approximating a common rail pressure falling curve before reaching a first minimal value and a straight line approximating the common rail pressure before the start of fuel injection.

2. A fuel injection method for engines according to claim 1, wherein the common rail pressure approximating straight line before the start of fuel injection is determined as an average value of the common rail pressures in a predetermined period ranging from the output timing of the injection command signal to a point before the timing at which the common rail pressure starts to fall.

3. A fuel injection method for engines according to claim 1, wherein two or more injectors are provided and, for each of the injectors, the injection delay time ranging from the output timing of the injection command signal to the fuel injection timing is determined and the output timing of the injection command signal is determined.

4. A fuel injection device for engines comprising:

a common rail to store fuel delivered by a fuel pump;

injectors having nozzle holes formed therein through which the fuel supplied from the common rail is injected into combustion chambers;

operating state detection means to detect the operating state of the engine;

a pressure sensor to detect the pressure of the common rail; and a controller to output an injection command signal to each of the injectors and select a basic target injection timing corresponding to a present engine operating state from basic target injection timing data;

wherein the controller determines, by using a predetermined function having as variables at least a timing after the start of fuel injection at which the common rail pressure starts to fall, an injection delay time that elapses from an output timing of the injection command signal to a fuel injection timing at which the fuel injection from each of the injectors is started, and also determines the output timing of the injection command signal from the basic target injection timing and the injection delay time;

wherein, using a graph with time and the common rail pressure as coordinate axes, the controller determines the timing at which the common rail pressure starts to fall due to fuel injection at a time coordinate of an intersection between a straight line approximating a common rail pressure falling curve before reaching a first minimal value and a straight line approximately the common rail pressure before the start of fuel injection.

5. A fuel injection device for engines according to claim 4, wherein the controller determines the common rail pressure approximating straight line before the start of fuel injection as an average value of the common rail pressures in a predetermined period ranging from the output timing of the injection command signal to a point before the timing at which the common rail pressure starts to fall.

6. A fuel injection device for engines according to claim 4, wherein the controller determines, for each of the injectors, the injection delay time ranging from the output timing of the injection command signal to the fuel injection timing, and the output timing of the injection command signal.

* * * * *